(12) United States Patent
Oude Egberick et al.

(10) Patent No.: US 7,947,327 B2
(45) Date of Patent: May 24, 2011

(54) METHOD FOR INCREASING METAL PRODUCTION IN SMELTER OPERATIONS

(75) Inventors: Gert-Jan Oude Egberick, Zeist (NL); Donald C. Roe, Jamison, PA (US); Paul Day, Antwerpen (BE)

(73) Assignee: General Electric Company, Schenectady, NY (US)

( * ) Notice: Subject to any disclaimer, the term of this patent is extended or adjusted under 35 U.S.C. 154(b) by 206 days.

(21) Appl. No.: 11/655,649

(22) Filed: Jan. 19, 2007

(65) Prior Publication Data

US 2008/0175771 A1  Jul. 24, 2008

(51) Int. Cl.
  *C22B 1/00* (2006.01)
  *B05D 7/24* (2006.01)
(52) U.S. Cl. .......................................... 427/215; 75/712
(58) Field of Classification Search .................... 427/215
  See application file for complete search history.

(56) References Cited

U.S. PATENT DOCUMENTS

| | | | |
|---|---|---|---|
| 3,624,019 A * | 11/1971 | Anderson et al. | 523/336 |
| 4,088,310 A * | 5/1978 | Noponen et al. | 266/162 |
| 4,139,455 A * | 2/1979 | Griffith et al. | 209/167 |
| 4,344,792 A | 8/1982 | O'Neill | |
| 4,381,066 A | 4/1983 | Page et al. | |
| 4,414,022 A | 11/1983 | Melcher | |
| 4,427,568 A | 1/1984 | Snyder et al. | |
| 4,511,676 A | 4/1985 | Reichgott et al. | |
| 4,605,568 A * | 8/1986 | Kober | 44/620 |
| 4,700,200 A | 10/1987 | Hibino | |
| 4,751,259 A * | 6/1988 | Roe et al. | 524/52 |
| 4,780,233 A | 10/1988 | Roe | |
| 5,079,036 A * | 1/1992 | Roe et al. | 427/212 |
| 6,284,077 B1 | 9/2001 | Lucas et al. | |
| 6,495,172 B1 * | 12/2002 | France et al. | 424/725 |
| 6,797,180 B2 | 9/2004 | Small et al. | |
| 2003/0032698 A1 * | 2/2003 | Smith et al. | 523/160 |

FOREIGN PATENT DOCUMENTS

CA   2444309   *   4/2004

OTHER PUBLICATIONS

Dictionary.com entry for "pyrite" copyright 2006.*

* cited by examiner

*Primary Examiner* — Roy King
*Assistant Examiner* — Tima M McGuthry-Banks
(74) *Attorney, Agent, or Firm* — Wegman, Hessler & Vanderburg

(57) ABSTRACT

A process for improving recovery of metal values in a smelting operation of the type wherein sulfidic ores are pyrometallurgically reduced. The process includes adding an anionic or non-ionic surfactant and blends thereof to the ore.

19 Claims, No Drawings

METHOD FOR INCREASING METAL PRODUCTION IN SMELTER OPERATIONS

FIELD OF THE INVENTION

The present disclosure pertains to methods for increasing production of metal values from sulfidic ores in smelting operations.

BACKGROUND OF THE INVENTION

Smelting is a common method for recovering the desired metal value from sulfidic ores. During the smelting process, the sulfur in the ore is oxidized, resulting in an exothermic reaction, whereby the heat generated is sufficient to melt the metal without the need for an external heat source. Typically, a carbonaceous reducing agent, such as coke, is employed in the reaction.

Reverberatory smelters, sometimes called "copolas" are commonly used. The fuel and metal ore charge are usually fed separately. In the first step, two liquids are formed: one is an oxide slag containing the impurities, and the other is a sulfide "matte" containing the valuable metal sulfide and some impurities. Fuel is burned at one end of the furnace, and the heat melts the dry sulfide concentrate (usually after partial roasting) which is fed through the openings in the roof of the furnace. The slag floats on the top of the heavier "matte" and is removed or rejected. The sulfide matte then is forwarded to a converter.

Metal production during the smelting operation is limited by the upper temperature limitations of the smelting furnace. Due to the exothermic nature of the pyrometallurgical reduction, adding additional metal sulfide has the same effect as adding more fuel. In order to increase production, smelters can benefit from smelting ores with increased surface moisture since the moisture will evaporate, reducing the temperature of the upper furnace, and thereby allowing more ore to be fed to the furnace, resulting in an increase in metal production.

While adding moisture to a sulfidic ore prior to smelting provides benefit, the amount of moisture added is limited due to problems that may be associated with increasing ore moisture content, such as caking and clogging of conveyor belts and other conventional ore transport means.

SUMMARY OF THE INVENTION

The present invention involves improvement of metal value yield in smelting processes of the type in which a sulfide containing metal ore is smelted. An aqueous solution or dispersion comprising a surfactant is brought into contact with the ore. In this manner, higher moisture content ores can enter the smelter, allowing for an increase in the amount of ore processed per given time period, and therefore an increase in metal production.

DETAILED DESCRIPTION OF EXEMPLARY EMBODIMENTS

In accordance with one exemplary embodiment, an aqueous solution or dispersion comprising a surfactant is applied to the sulfidic ore prior to entry into the smelter. Preferably, the surfactant may be applied in the form of an aqueous foam.

With respect to foam formation, air is preferred for use as the foam forming gas. Details of the foam forming process are not critical to the invention. Generally, foam may be produced as stated in U.S. Pat. No. 4,700,200 (Cole), the disclosure of which is incorporated herein. Typically, the aqueous based surfactant is mixed with air at a ratio of about one gallon liquid with from about 1-100, preferably 1-10, scf air. The air and liquid may combine at a point immediately upstream from the mixing chamber. The mixing chamber may be a packed column, venturi, or static mixer. The purpose of the mixing chamber is to induce the air in liquid dispersion that is defined as a "foam". Acceptable foam properties include expansion ratios (volume foam:volume liquid) on the order of about 10-100. Average bubble size is on the order of about 200 microns or less. Exemplary feed rates would range from about 0.1-1.0 pounds of active surfactant per ton of metal sulfide.

Exemplary surfactants that can be used include the anionic surfactants and non-ionic surfactants. Preferably, the non-ionic surfactants have an HLB of between about 10-15. Blends of the aforementioned surfactants can also be mentioned.

Suitable anionic surfactants include sulfates and sulfonates such as alkyl aryl sulfonic acids, alkyl sulfonic acids, alkenyl sulfonic acids, sulfonated alkyls, sulfonated alkyl ethers, sulfonated alkenyls, sulfated fatty esters, and the sulfosuccinates.

The term anionic surfactants should be broadly construed to include the anionic detergents such as the long chain alpha olefin sulfonates, water soluble salts of alkenyl sulfonic acid, such as the sodium salt of $C_{14}$-$C_{18}$ alpha olefin sulfonates, water soluble alkyl aryl sulfonic acid salts, such as sodium alkylnaphthalene sulfonate and sodium alkyl benzene sulfonate and water soluble salts of lauryl sulfate.

Particularly preferred anionic surfactants are esters represented by the formula

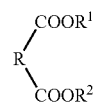

wherein R is an aliphatic carbon chain containing at least one sulfonic group and $R^1$ and $R^2$ may be the same or different, but are chosen from alkyl groups having from 3 to about 18 carbon atoms. Most preferred are the succinic acid esters such as the dioctylester of sodium sulphosuccinic acid.

Exemplary non-ionic surfactants include alkyl phenols, such as the polyalkylene alkyl phenols; polyalkoxylated alkyl phenols; polyoxyalkylene polymers and block copolymers, glycol esters, glycol ethers including diethylene glycol esters, and diethylene glycol ethers, and polyalkylene glycols.

Specific non-ionic surfactants that may be mentioned include polyethylene nonyl phenol, polyethoxylated nonyl phenol, polyoxyethylene polymers and polyoxypropylene polymers, (EO) ethylene oxide (PO) propylene oxide polymers, polyethylene oxide octyl phenol ether, polyoxyethylene glycol dioleate, propylene glycol, and diethylene glycol ethers such as the "carbitol" series and diglymes.

Exemplary compounds falling within the classification of diethylene glycol ether compounds include diethylene glycol monobutyl ether, diethylene glycol monobutyl ether acetate, diethylene glycol monoethyl ether acetate, diethylene glycol monoethyl ether, diethylene glycol dibutyl ether, diethylene glycol monohexyl ether, diethylene glycol monomethyl ether, and diethylene glycol monomethyl ether acetate. Additionally, diglyme (diethylene glycol dimethyl ether), ethyl diglyme (diethylene glycol diethyl ether), and tetraglyme (tetraethylene glycol dimethyl ether may also be mentioned.

Accordingly, the diethylene glycol ether compounds may be defined as having the formula:

wherein $R^3$ and $R^4$ are independently selected from the group consisting of $C_1$-$C_8$ lower alkyl, acyl and hydrogen; n is equal to 1 or 2. Of these, diethyleneglycol monobutyl ether (sometimes referred to as butyl carbitol) is preferred.

Preferably, the foam or other carrier containing the surfactant or surfactant blend is fed to the sulfidic ore in an amount of about 0.01 to about 5.0 pounds of active surfactant(s) per ton of metal sulfide. More preferably, from about 0.01 to 1.0 pounds of surfactant(s) is fed per ton of metal sulfide.

Any sulfidic ore that is to be smelted may benefit from the invention. For example, the surfactant treatment may be applied to sulfidic ores such as Au, Fe, Ag, Ni, Cu, Zn, Pb, and Mo ores.

Field Trial

At one zinc smelting operation, ZnS ore was treated with a foamed surfactant formulation comprising on all actives bases 45 wt % sodium dioctyl sulfosuccinate
9.65 wt % propylene glycol
25.70 wt % diethylene glycol monobutyl ether remainder water.

Typically, the ZnS ore fed to the smelter had a moisture content of about 10% as received. Normally, when the ore was sprayed with water to increase the moisture content to about 12.0 wt %, flow and plugging problems were encountered. When the above surfactant blend was foamed onto the ore, moisture contents of from 12.0 to about 14.0 wt % could be processed without significant hopper blockage, transport or plugging problems.

While this invention has been described with respect to particular embodiments thereof, it is apparent that numerous other forms and modifications of this invention will be obvious to those skilled in the art. The appended claims and this invention generally should be construed to cover all such obvious forms and modifications which are within the true spirit and scope of the present invention.

What is claimed is:

1. In a process in which a sulfidic ore is conveyed to a smelting furnace by a transport means, the improvement comprising contacting said sulfidic ore with a foamed surfactant composition, said foamed surfactant composition comprising air and a liquid component, said liquid component comprising anionic surfactant and water whereby moisture content of said sulfidic ore is increased without resulting in significant plugging of said transport means.

2. A process as recited in claim 1 wherein said foamed surfactant composition is applied to said sulfidic ore to result in a moisture content of said sulfidic ore of about 12% and greater.

3. A process as recited in claim 2 wherein said ore is a ZnS ore.

4. A process as recited in claim 1 wherein said liquid component further comprises a non-ionic surfactant.

5. A process as recited in claim 4 wherein said anionic surfactant is a sulfosuccinate or a sulfonate.

6. A process as recited in claim 5 wherein said sulfosuccinate is sodium dioctyl sulfosuccinate.

7. A process as recited in claim 4 wherein said non-ionic surfactant is a diethyleneglycol ether.

8. A process as recited in claim 4 wherein said non-ionic surfactant is an alkoxylated alkyl phenol.

9. A process as recited in claim 4 wherein said non-ionic surfactant is an alkyl phenol.

10. A process as recited in claim 4 wherein said non-ionic surfactant is a glycol ether.

11. A process as recited in claim 4 wherein said foamed surfactant composition is applied to said sulfidic ore in an amount of about 0.01-5.0 pounds of surfactant per ton of said sulfidic ore.

12. A process as recited in claim 11 wherein, after application of said foamed surfactant composition to said sulfidic ore, said sulfidic ore has a moisture content of about 12-14%.

13. A process as recited in claim 11 wherein said foamed surfactant composition has an average bubble size of about 200 microns or less and an expansion ratio of between about 10 and about 100.

14. In a process in which a sulfidic ore is conveyed to a smelting furnace by a transport means, the improvement comprising contacting said sulfidic ore with a foamed surfactant composition, said foamed surfactant composition comprising air and a liquid component, said liquid component comprising anionic surfactant and water whereby moisture content of said sulfidic ore is increased without resulting in significant plugging of said transport means, said liquid component further comprising a non-ionic surfactant, wherein said non-ionic surfactant is a block EO-PO polymer.

15. In a process in which a sulfidic ore is conveyed to a smelting furnace by a transport means, the improvement comprising contacting said sulfidic ore with a foamed surfactant composition, said foamed surfactant composition comprising air and a liquid component, said liquid component comprising water, a sulfosuccinate anionic surfactant, and a non-ionic surfactant, whereby said contacting of said sulfidic ore with said foamed surfactant composition results in increased moisture content of said sulfidic ore without resulting in significant plugging of said transport means.

16. A process as recited in claim 15 wherein said contacting increases the moisture content of said sulfidic ore, to about 12% and greater.

17. A process as recited in claim 15, wherein said liquid component further comprises a non-ionic surfactant, said non-ionic surfactant comprising a diethylene glycol ether.

18. A process as recited in claim 17 wherein said non-ionic surfactant further comprises propylene glycol.

19. In a process in which a sulfidic ore is conveyed to a smelting furnace by a transport means, the improvement comprising contacting said sulfidic ore with a foamed surfactant composition to result in a moisture content of said ore of about 12% and greater without resulting in significant plugging of said transport means, said foamed surfactant composition comprising air and a liquid component, said liquid component including sodium dioctyl sulfosuccinate, propylene glycol and diethylene glycol monobutyl ether, and water.

* * * * *

UNITED STATES PATENT AND TRADEMARK OFFICE
CERTIFICATE OF CORRECTION

| | | |
|---|---|---|
| PATENT NO. | : 7,947,327 B2 | Page 1 of 1 |
| APPLICATION NO. | : 11/655649 | |
| DATED | : May 24, 2011 | |
| INVENTOR(S) | : Gert-Jan Oude Egberink, Donald C. Roe and Paul Day | |

It is certified that error appears in the above-identified patent and that said Letters Patent is hereby corrected as shown below:

Title page, Items (12) and (75) please correct the inventor's name GERT-JAN OUDE EGBERICK to read as GERT-JAN OUDE EGBERINK Signed and Sealed this
Fifth Day of July, 2011

David J. Kappos
*Director of the United States Patent and Trademark Office*